Jan. 2, 1940.  J. G. McCOMB  2,185,600
LIGHTING DEVICE FOR USE ON BICYCLES AND THE LIKE
Filed Nov. 25, 1938  3 Sheets-Sheet 1

Inventor
James G. McComb.
By Mp+ Richard Kraus
Atty.

Jan. 2, 1940.   J. G. McCOMB   2,185,600
LIGHTING DEVICE FOR USE ON BICYCLES AND THE LIKE
Filed Nov. 25, 1938   3 Sheets-Sheet 2
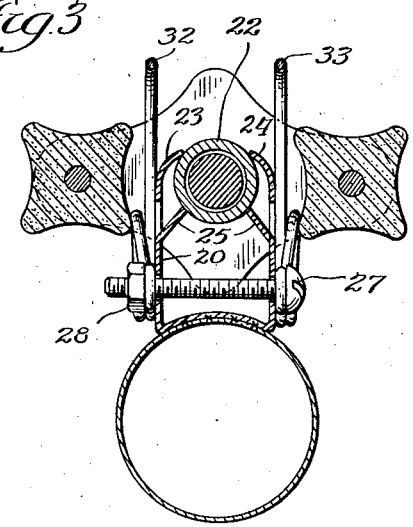
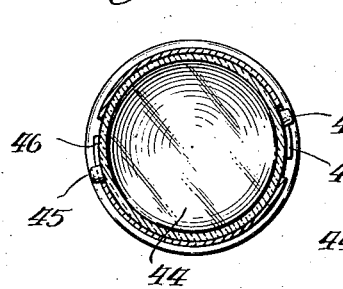
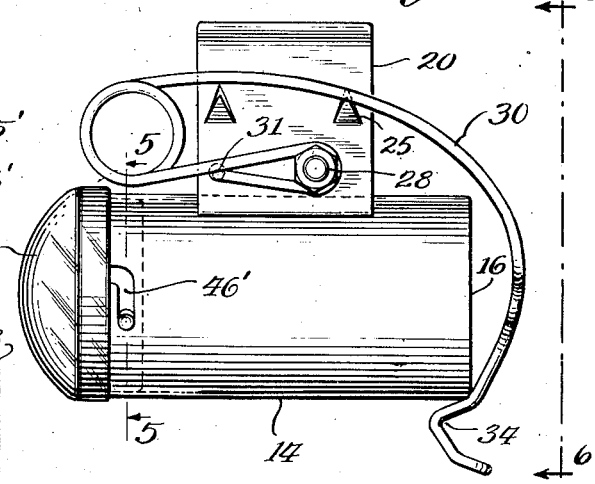
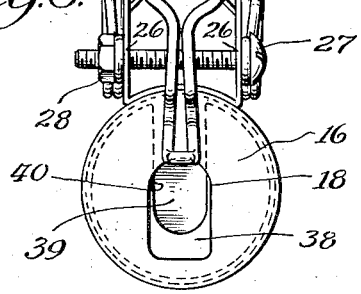
Inventor
James G. McComb
By [signature]
Atty.

Jan. 2, 1940.　　　　　J. G. McCOMB　　　　　2,185,600
LIGHTING DEVICE FOR USE ON BICYCLES AND THE LIKE
Filed Nov. 25, 1938　　　3 Sheets-Sheet 3
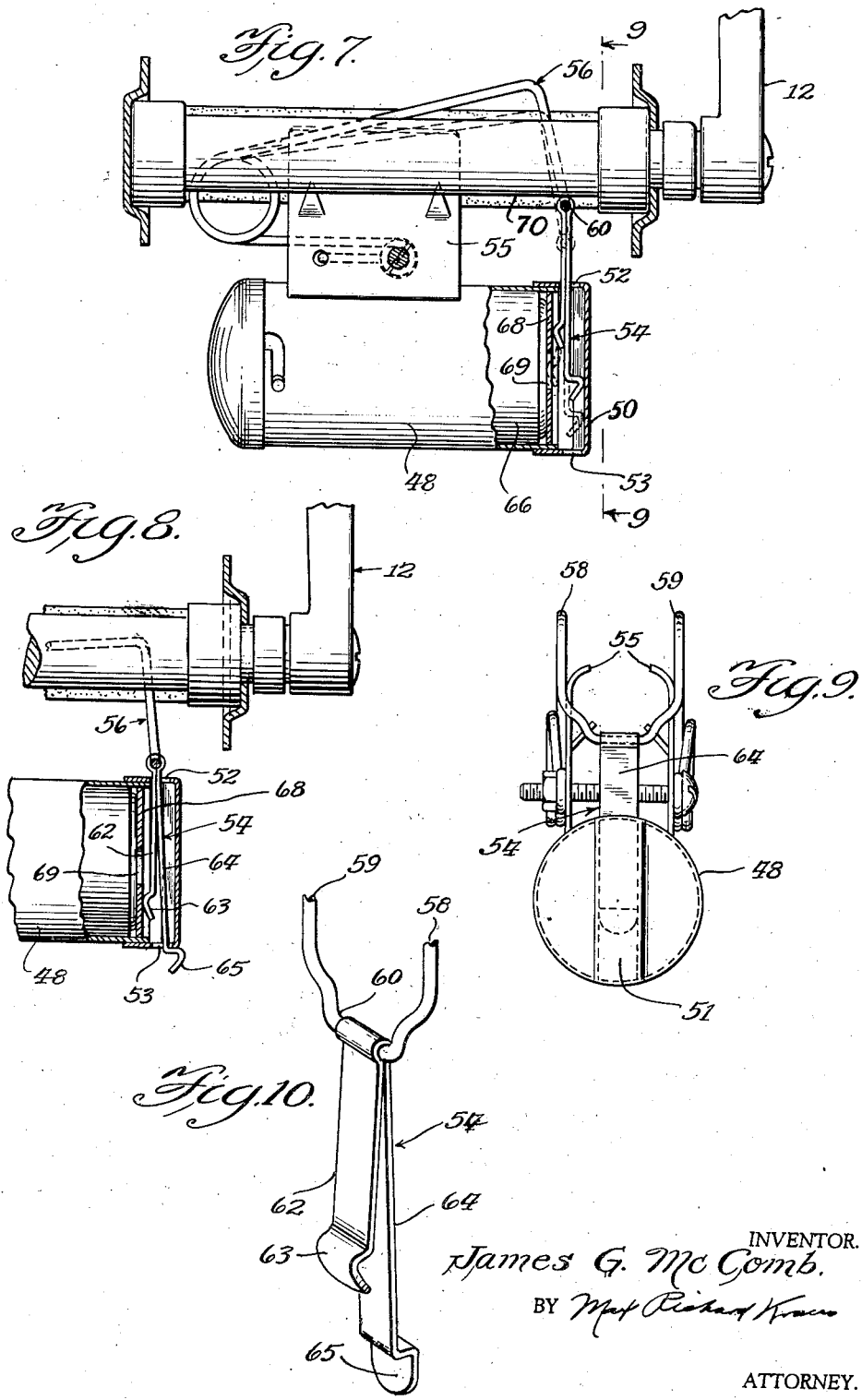

Patented Jan. 2, 1940

2,185,600

UNITED STATES PATENT OFFICE 2,185,600

LIGHTING DEVICE FOR USE ON BICYCLES AND THE LIKE

James G. McComb, Chicago, Ill.

Application November 25, 1938, Serial No. 242,181

5 Claims. (Cl. 240—7.55)

This invention relates to lighting devices and more particularly to a lighting device for use on bicycles and the like.

The increased popularity of the use of bicycles has been attended with an alarmingly high rate of accidental injuries, a great number of which occur after dark and are due primarily to the lack of adequate lighting means on the bicycles. While it is common practice to position lamps on the front and rear of bicycles, up to the present, no one lighting device has been developed which is adapted to protect the sides, in addition to the front and rear of the bicycle. It is common knowledge that a large percentage of the accidental injuries are occasioned by the collision of a moving vehicle into the side of a bicycle. Obviously, the lack of proper lamps has been, in most cases, the primary cause of these accidents.

It is apparent that, as a practical matter, the lamps on a bicycle must be of small construction. The amount of light emanating therefrom is usually small and since the lamps are stationarily fixed they are inadequate for the purposes of attracting attention.

It is, therefore, an object of this invention to provide a lighting device which is adapted to be mounted on a moving part of a bicycle so as to be in continuous motion while the bicycle is in operation.

Another object of this invention is the provision of a lighting device for mounting on a bicycle pedal wherein the light signal is movable with the pedal and is visible from the side of the bicycle as well as from the front and rear of same.

A still further object of this invention is the provision of a lighting device for attachment to a bicycle pedal which moves with the pedal as the bicycle is propelled so as to present a movable signal light and thereby readily attract the attention of motorists.

A further object of this invention is the provision of a lighting device for a bicycle which is self contained as a unit and which is easily installed.

A further object of this invention is the provision of a lighting device which is adapted to be actuated only when the bicycle is in operation and which returns to off position when bicycle is not in use.

A still further object of this invention is the provision of a lighting device of the character described which is efficient in operation and which is simple and inexpensive to manufacture.

With the foregoing and other objects in view, the invention consists of the novel construction, combination and arrangement of parts, as hereinafter more specifically described and illustrated in the accompanying drawings wherein is shown a device in accordance with this invention, but it is to be understood that changes, variations and modifications can be resorted to which fall within the scope of the appended claims.

In the drawings wherein like reference characters denote corresponding parts through the several views:

Fig. 3 is a vertical sectional view taken on line 3—3 of Fig. 2.

Fig. 4 is an elevational view showing the switching mechanism in locked off position.

Fig. 5 is a vertical sectional view taken on line 5—5 of Fig. 4.

Fig. 6 is an end elevational view looking in the direction of the arrows of line 6—6 of Fig. 4 showing the switching mechanism in normal unlocked position.

Fig. 7 is an elevational view partly in section showing a modified embodiment of the invention as mounted on a bicycle foot pedal.

Fig. 8 is a fragmentary view showing the modified embodiment in locked off position.

Fig. 9 is an end elevational view of the modified embodiment of the invention looking in the direction of the arrows of line 9—9 of Fig. 7.

Fig. 10 is an enlarged perspective view of a detail.

Figure 1:
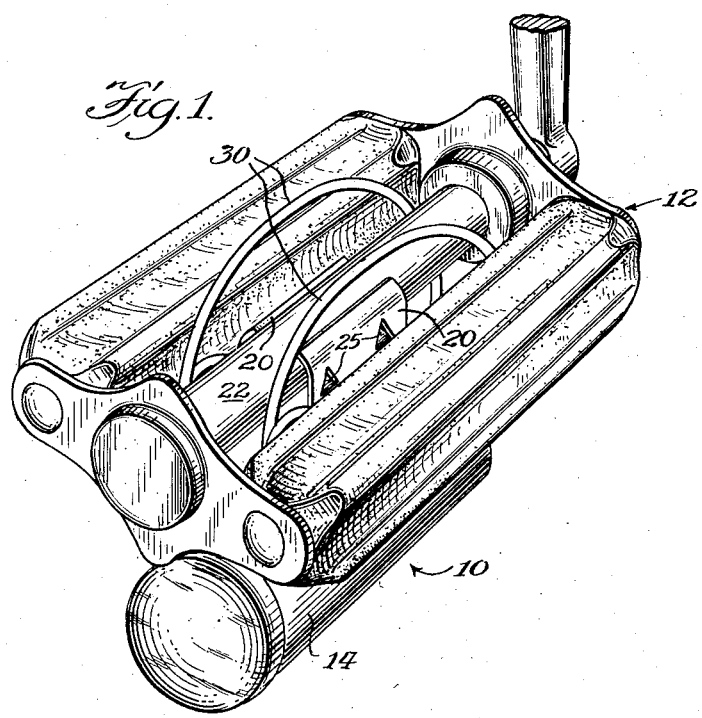
Fig. 1 is a perspective view showing an embodiment of the invention as mounted on a bicycle foot pedal.

In the drawings, wherein for purposes of illustration is shown a preferred embodiment of my invention the numeral 10 designates generally, my lighting device mounted on a conventional bicycle pedal 12. The lighting device 10 comprises a tubular body portion 14 which is preferably circular in cross section. The tubular portion 14 includes a rear wall 16 which is provided with an elongated aperture 18.

Rigidly secured to said body portion is a supporting member 20 which is substantially U shaped and which serves to secure the device on a convenient member 22 of the bicycle pedal 12. The legs 23 and 24 of the supporting member 20 are preferably bent towards each other at their upper portions, and are provided with a plurality of sharp teeth 25 which are formed as by stamping and which serve to more efficiently grip the pedal member 22. Suitable apertures 26 are provided in the legs 23 and 24 to accommodate a bolt 27 and nut 28 for drawing the legs 23 and 24 together to clamp them on the pedal member 22.

Figure 2:
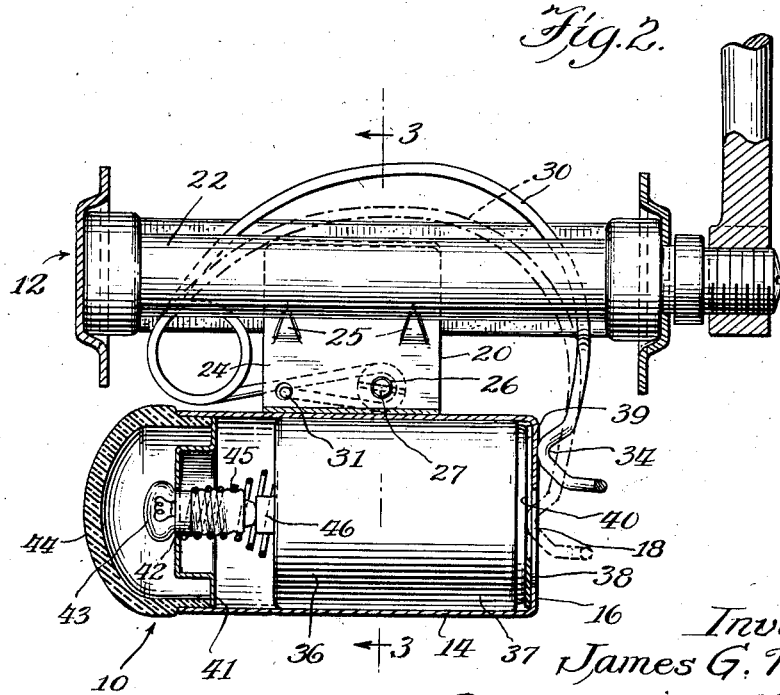
Fig. 2 is a sectional elevational view of my device showing the positioning and operation of same on a bicycle foot pedal.

A spring switching member 30, shaped substantially as shown in Figs. 2 and 6, is mounted on the supporting member 20 and is secured thereon by the nut 28 and bolt 27, being anchored at one end in apertures 31 provided in the legs 23 and 24. It will be seen that the switching member 30 comprises two parallel integrally formed legs 32 and 33 which are shaped at their juncture so as to provide a contact portion 34 as well as a hook for locking same on the body portion 14.

A conventional flash light battery 36 is contained in the tubular body portion 14 and is insulated therefrom by the conventional fibre battery cover in which the battery cell is normally encased, and a nonconducting disc 38 positioned between the base 39 of the battery and the rear wall 16. Said disc is provided with an aperture 40 which is shaped similarly to the aperture 18 provided in the end wall 15, both apertures being adapted for alignment with each other to permit exposure of the metal base 39 of the battery cell.

A flanged disc 41 adapted to contact the interior of the body portion 14 is provided with a central aperture 42 which serves as a guide for a conventional flash light bulb 43. A coil spring 45 having a pitch similar to the pitch of the threaded portion on the base of the bulb 43 serves as a socket for the bulb 43. Said spring at one end abuts the battery cell 36 and at the other end the flanged disc 41 and serves to maintain said disc in abutment with the lens 44. Said lens is of the mushroom type and is preferably made of non-breakable material. A lens, of the shape described, permits a light signal to be visible from the sides as well as from the front and rear when mounted on a bicycle pedal. Protuberances 45' are formed on the periphery of the lens and are adapted to be received in the L shaped slots 46' formed in the mouth of the body portion and serve to secure said lens on said body portion.

In operation, the device is clamped on a convenient member 22 of a bicycle pedal 12 and is rigidly secured thereon by tightening the nut 28 and bolt 27 on the supporting member 20 and drawing the legs 23 and 24 together so that the teeth 25 grip the pedal member 22. As will be seen, by reference to the drawings, the legs 32 and 33 of the spring switching member 30 normally project above the surface plane of the pedal 12 and assume the position shown by the solid lines in Fig. 2. In this position, the contact portion 34 of the spring switch 30 normally bears on the tubular body portion 14 and the electric circuit of the device is normally open.

When a rider mounts the bicycle and places his foot on the pedal he depresses the spring switch member 30 and causes contact portion 34 to enter the apertures 18 and 40 to assume the position shown by the dotted lines in Fig. 2. In this position, the contact portion 34 of the switch member 30 bears against the exposed base portion of the battery cell and an electrical circuit is completed, the current flowing from the positive terminal 48 of the battery cell, through the lamp 43, through the flanged disc 41, through the tubular body portion 14, through the supporting member 20, through the spring switch 30 and through the negative terminal of the battery cell which is the metal casing 37 of the battery cell.

When the rider dismounts the spring switch 30 automatically returns to its normal position, previously described, and the light is extinguished thereby eliminating unnecessary use of the battery cell.

For daytime driving when a signal light is not required, the spring switch member 30 is moved downwardly until the terminal portion 34 of the member 30 engages the lower peripheral edge of the tubular body portion, as shown in Fig. 4. This serves to lock the switching member 30 so that it is maintained below the plane of the foot pedal surface thereby preventing any possibility of accidental contact being made between the switch 30 and battery cell 36 whereby the circuit would be closed and the bulb lighted.

In the modified embodiment shown in Figs. 7 to 10 inclusive the numeral 48 designates a tubular body portion having a flanged cap 50 at one end thereof. Said cap has formed thereon an embossed portion 51 which extends diametrically across said cap. Slots 52 and 53 are formed in the flange of the cap 50, in alignment with the embossed portion 51, and are adapted to accommodate a switch contact member 54 presently to be described. A supporting member 55 similar to the supporting member 20, previously described, is secured to the body portion 48 and serves to secure the device on a bicycle pedal. The switch actuating member 56 is shaped substantially as shown and is mounted in a manner similar to the spring switching member 30. The switch actuating member 56 comprises two parallel integrally formed legs 58 and 59 on which is pivotally mounted at their juncture 60, a switch contact member 54 which is adapted to be received in the slots 52 and 53. Said member comprises two integrally formed legs 62 and 64, one leg being of greater length than the other. The shorter leg 62 has formed at its extremity an embossed portion 63 which serves as a contact surface. The longer leg 64 is provided at its extremity with a hook shaped portion and tongue 65 which is adapted to slide in the embossed portion 51 of the cap 50 and be guided thereby. As previously described, a conventional flash light cell 66 is contained in the tubular body portion 48 and is insulated therefrom, at the base, by a fibre disc 68 which is positioned between the battery cell 66 and the body portion 48. Said disc is provided with a central aperture 69 through which the embossed portion 63 of the leg 62 is adapted to contact the metal battery casing to close an electric circuit. Normally, the switching member assumes the position shown by the solid lines in Fig. 7, the embossed portion 63 bearing on the fibre disc 68 and out of contact with the battery cell casing. When the switch actuating member 56 is depressed to assume a position as shown by the dotted lines in Fig. 7, the leg 62 is moved downwardly and the embossed portion 63 caused to enter the aperture 69 thus contacting the exposed surface of the battery cell casing and closing an electrical circuit.

Because the legs 62 and 64 are in resilient relationship and tend to spread apart, a positive electrical contact is effected between the battery casing and the embossed portion 63 while the leg 64 is at all times retained in the embossed portion 51 of the cap 50.

As will be seen by reference to the drawings when the device is mounted on a foot pedal the juncture portion 60 of the actuating member 56 bears against the pedal member 70 which serves to limit its upper movement, thus effectively preventing the switch contact member 54 from being pushed accidentally out of the slot 52.

When it is desired to lock the switching mechanism in nonoperative position, as for daytime use, the actuating member 56 is depressed so that the terminal portion 65 of the leg 64 is pushed through the lower slot 53, the normal resiliency of the leg 64 causing the hook portion 65 to grip the peripheral edge of the cap 50 and secure the switch contact member 54 in locked position.

It will be noted that the weight of the lighting device will normally cause it to hang suspended below the pedal so that its positioning in no way interferes with the bicycle rider. While the bicycle is being propelled, the lighting device in moving with the pedal describes a circle, when viewed from the side of the bicycle, and a vertical line when viewed from the front or rear of the bicycle, thereby providing a very effective method of signalling and attracting attention.

It is to be understood that the form of my invention, herewith shown and described, is to be taken as a preferred example of the same, and that various changes in the shape, size and arrangement of parts may be resorted to, without departing from the spirit of my invention, or the scope of the appended claims.

I claim:

1. In a device of the class described, a housing, a battery cell within said housing, an electric light bulb in electrical circuit with said battery cell, a clamping member for securing said housing to a bicycle pedal, a switch member extending above the surface plane of the pedal and adapted to close the circuit between said battery and said bulb when said switch member is depressed by the foot, said switch member adapted to be locked in inoperative position and when so locked to assume a position below the surface plane of said pedal to prevent actuation of said switch member by the foot, said switch member when locked in inoperative position opening the circuit between said battery cell and said bulb.

2. In a device of the class described, a housing adapted to contain a battery cell and electric light bulb, clamping means for securing said housing to a pedal of a bicycle, a switch member mounted on said housing, and in off position, normally projecting above the surface plane of said pedal, said switch member adapted to be locked in off position and when so locked to assume a position below the surface plane of said pedal to prevent the actuation of said switch member.

3. In a device of the class described, a housing adapted to be secured to a bicycle foot pedal longitudinally of said pedal for movement therewith, a battery cell and electric light bulb contained in said housing, a lens portion facing outwardly of said pedal and arranged to permit light from said electric bulb to be simultaneously visible from the front, rear and side of the vehicle on which said device is mounted, a switch member mounted on said housing, said switch member, in off position, normally projecting above the surface plane of said pedal and adapted to be depressed by the foot of the rider of said vehicle to close an electrical circuit and light up said bulb, said switch member adapted to return to normal off position when the foot of the rider is removed from said pedal.

4. In a device of the class described, a housing adapted to contain a battery cell and electric light bulb, clamping means for securing said housing to a pedal of a bicycle, a switch member mounted on said housing, and in off position, normally projecting above the surface plane of said pedal, said switch member being depressible to close the circuit between the battery and the electric light bulb, and being further depressible to break the circuit, and means for locking the switch in said last named position.

5. In a device of the class described for attachment to a bicycle foot pedal, comprising a housing mounted on said pedal in parallel axial alinement with said pedal, a lens mounted on said housing in coaxial alinement therewith and facing outwardly of said pedal to permit light to be simultaneously visible from the front, rear and side of the bicycle, a battery cell and electric light bulb contained in said housing, a switch member mounted on said housing, said switch member, in off position, normally projecting above the surface plane of said pedal and adapted to be depressed by the foot of the rider of said bicycle to close an electrical circuit and light up said bulb, said switch member adapted to return to normal off position when the foot of the rider is removed from said pedal, said switch member having means for locking same in off position and when so locked to assume a position below the surface plane of said pedal to prevent actuation of said switch member by the foot.

JAMES G. McCOMB.